United States Patent
Mogal et al.

(10) Patent No.: US 9,026,965 B2
(45) Date of Patent: May 5, 2015

(54) ARRIVAL EDGE USAGE IN TIMING ANALYSIS

(71) Applicant: Synopsys, Inc., Mountain View, CA (US)

(72) Inventors: Hushrav Darabshah Mogal, Mountain View, CA (US); Rupesh Nayak, San Ramon, CA (US); Peivand Tehrani, Campbell, CA (US)

(73) Assignee: Synopsys, Inc., Mountain View, CA (US)

( * ) Notice: Subject to any disclaimer, the term of this patent is extended or adjusted under 35 U.S.C. 154(b) by 0 days.

(21) Appl. No.: 13/797,926

(22) Filed: Mar. 12, 2013

(65) Prior Publication Data

US 2014/0282317 A1 Sep. 18, 2014

(51) Int. Cl.
*G06F 17/50* (2006.01)

(52) U.S. Cl.
CPC ........ *G06F 17/5031* (2013.01); *G06F 17/5036* (2013.01); *G06F 17/5081* (2013.01); *G06F 2217/84* (2013.01)

(58) Field of Classification Search
USPC ................................................. 716/104–109
See application file for complete search history.

(56) References Cited

U.S. PATENT DOCUMENTS

| | | | |
|---|---|---|---|
| 7,454,731 B2 | 11/2008 | Oh et al. | |
| 7,861,198 B2 | 12/2010 | Ding et al. | |
| 7,900,165 B2 | 3/2011 | Oh et al. | |
| 7,962,876 B2 | 6/2011 | Oh et al. | |
| 8,091,049 B2 | 1/2012 | Zejda et al. | |
| 8,219,952 B2 | 7/2012 | Tehrani et al. | |
| 8,336,013 B2 | 12/2012 | Oh et al. | |
| 8,341,574 B2 | 12/2012 | Gandikota et al. | |
| 8,443,321 B1 * | 5/2013 | Fender et al. | 716/111 |
| 2002/0166101 A1 * | 11/2002 | Casavant | 716/6 |
| 2006/0112359 A1 | 5/2006 | Becer et al. | |
| 2007/0106969 A1 * | 5/2007 | Birch et al. | 716/6 |
| 2008/0243414 A1 | 10/2008 | Oh et al. | |
| 2009/0055787 A1 | 2/2009 | Oh et al. | |
| 2009/0089729 A1 | 4/2009 | Ding et al. | |
| 2010/0005429 A1 | 1/2010 | Zejda et al. | |
| 2010/0218152 A1 | 8/2010 | Tehrani et al. | |
| 2010/0229136 A1 | 9/2010 | Gandikota et al. | |
| 2011/0113396 A1 | 5/2011 | Oh et al. | |
| 2011/0185335 A1 | 7/2011 | Oh et al. | |
| 2012/0131525 A1 | 5/2012 | Oh et al. | |
| 2012/0239371 A1 | 9/2012 | Tehrani et al. | |

OTHER PUBLICATIONS

Refining Switching Window by Time Slots for Crosstalk Noise Calculation, by Chen et al., 0-7803-7607-2/02/ © 2002 IEEE.
Victim Alignment in Crosstalk-Aware Timing Analysis, by Gandikota et al., IEEE Transactions on Computer-Aided Design of Integrated Circuits and Systems, vol. 29, No. 2, Feb. 2010.

* cited by examiner

Primary Examiner — Binh Tat
(74) Attorney, Agent, or Firm — Adams Intellex, PLC

(57) ABSTRACT

A logic design is analyzed using static timing analysis and timing edge tracking for various nets within the logic design. Crosstalk analysis is performed on the logic design to evaluate timing impacts. To reduce pessimism of crosstalk analysis for a victim net, arrival edges are tracked for the victim net. The switching times of the aggressor net are compared to the edges of the victim net during crosstalk analysis.

34 Claims, 7 Drawing Sheets

ARRIVAL EDGE USAGE IN TIMING ANALYSIS

FIELD OF ART

This application relates generally to computer aided design analysis and more particularly to using arrival edges in timing analysis of electronic circuits.

BACKGROUND

Use of computer aided design (CAD) and analysis tools is a standard practice for modern electronic circuit designers. Electronic designs may be described using many different methodologies. Hardware description languages, such as very high speed integrated circuit (VHSIC) hardware description language (VHDL), Verilog—a language which has been standardized by the Institute of Electrical and Electronic Engineers (IEEE) as IEEE 1364—or another hardware description language may be used by a designer to describe a circuit. Graphically based systems such as schematic entry systems, physical layout tools, or other types of graphical tools may be used in some cases to describe a circuit.

Once the basic functionality of a circuit has been entered, computer-based tools may transform the description into a description with a lower level of abstraction. For example, a hardware description language may describe the operation of an arithmetic logic unit (ALU) using logical and/or arithmetical operations without any particular implementation in the gates or transistors being described by the designer. The computer tools may transform the ALU description into a set of NAND gates connected in a particular fashion. Another computer tool may then take the description of the set of interconnected NAND gates and generate a physical design describing many different layers of an integrated circuit that may create various metal-oxide-semiconductor field-effect transistors (MOSFET, or simply FET) interconnected by conductive traces.

Computer tools may be used at one or more stages of the process to analyze the circuit. At a very high level, some tools may perform a functional analysis, while other tools may perform a bit-accurate simulation of a binary value for each node of the design over time. Other computer analysis tools may perform various low-level analyses, such as timing analysis, crosstalk analysis, power analysis, transmission-line analysis, or other physical analysis. In the large, complex circuits which are common today, it may be difficult to perform such low-level analysis; the very large number of elements and nodes in the circuit means that analysis may require looking at a large number of combinations. In some cases, certain assumptions may be made to simplify the analysis, but may result in less accurate analysis.

SUMMARY

A logic design is analyzed using static timing analysis and timing edges are tracked for the various nets of the logic design. In some embodiments, the timing edges may be encoded and may be stored as a worst case delay edge and a bit vector to encode other timing edges for a net. Crosstalk analysis is also performed on the logic design. To reduce pessimism of crosstalk analysis for a victim net, arrival edges are tracked for the victim net and used for crosstalk analysis. An aggressor net, which is capacitively coupled to the victim net, has one or more switching regions. The switching regions of the aggressor net are compared to the arrival edges of the victim net for crosstalk analysis. A computer-implemented method for timing analysis is disclosed comprising: obtaining a description for a logic design; tracking timing edges on logic waveforms from the logic design; performing static timing analysis using the description and the timing edges that were tracked; and performing crosstalk analysis based on the timing edges that were tracked.

The description for the logic design may include a graph description. The obtaining of the description for the logic design may comprise generating the graph description based on the logic design. The timing edges may include a timing edge for a fastest maximum delay timing path and a timing edge for a slowest maximum delay timing path. The timing edges may further comprise a timing edge for a fastest minimum delay timing path and a timing edge for a slowest minimum delay timing path. The performing crosstalk analysis may include analysis of a victim net and an aggressor net. The performing crosstalk analysis may include analysis of a victim net and a plurality of aggressor nets. The timing edges may include one or more of a leading edge and a trailing edge. The timing edges may be calculated using on-chip variation (OCV). The timing edges may be for a victim net. The crosstalk analysis may be based on an aggressor net and a victim net. Timing for the aggressor net and the victim net may be based on OCV. The timing edges may be based on converging waveforms within the logic design. The static timing analysis may be performed without using timing arrival windows on a victim net. The tracking of an edge within the timing edges may track a worst delay timing path. The worst delay timing path may include a maximum delay timing path used in setup analysis. The worst delay timing path may include a minimum delay timing path used in hold analysis. The method may further comprise tracking a timing between the edge and a second edge for another worst delay timing path. The method may further comprise encoding the timing between the edge for the worst delay timing path and the second edge. The method may further comprise using a bit vector for the encoding. A plurality of converging waveforms may be analyzed by performing bit operations on bit vectors for the plurality of converging waveforms. The bit vector may describe discrete intervals. The encoding may define a fastest maximum delay timing path and a slowest maximum delay timing path or a fastest minimum delay timing path and a slowest minimum delay timing path. The logic design may include multiple paths which converge where timing through the multiple paths has time between a fastest maximum delay timing for one path and a slowest maximum delay of another path and where an aggressor signal switches in the time between the fastest maximum delay timing and the slowest maximum delay and where the multiple paths which converge form a victim net.

In embodiments, a computer-implemented method for semiconductor timing analysis may comprise: obtaining a description for a logic design on a semiconductor chip; analyzing timing for the logic design; tracking timing edges on logic waveforms from the logic design based on the analyzing; and performing crosstalk analysis to determine a timing impact of one net switching that is a neighbor to a net for which the timing edges were tracked. In some embodiments, a computer system for timing analysis may comprise: a memory which stores instructions; one or more processors coupled to the memory wherein the one or more processors are configured to: obtain a description for a logic design; track timing edges on logic waveforms from the logic design; perform static timing analysis using the description and the timing edges that were tracked; and perform crosstalk analysis based on the timing edges that were tracked. In embodiments, a computer program product embodied in a non-transitory computer readable medium for design timing may comprise: code for obtaining a description for a logic design; code for tracking timing edges on logic waveforms from the logic design; code for performing static timing analysis using the description and the timing edges that were tracked; and code for performing crosstalk analysis based on the timing edges that were tracked.

Various features, aspects, and advantages of various embodiments will become more apparent from the following further description.

BRIEF DESCRIPTION OF THE DRAWINGS

The following detailed description of certain embodiments may be understood by reference to the following figures wherein.

DETAILED DESCRIPTION

Figure 1:
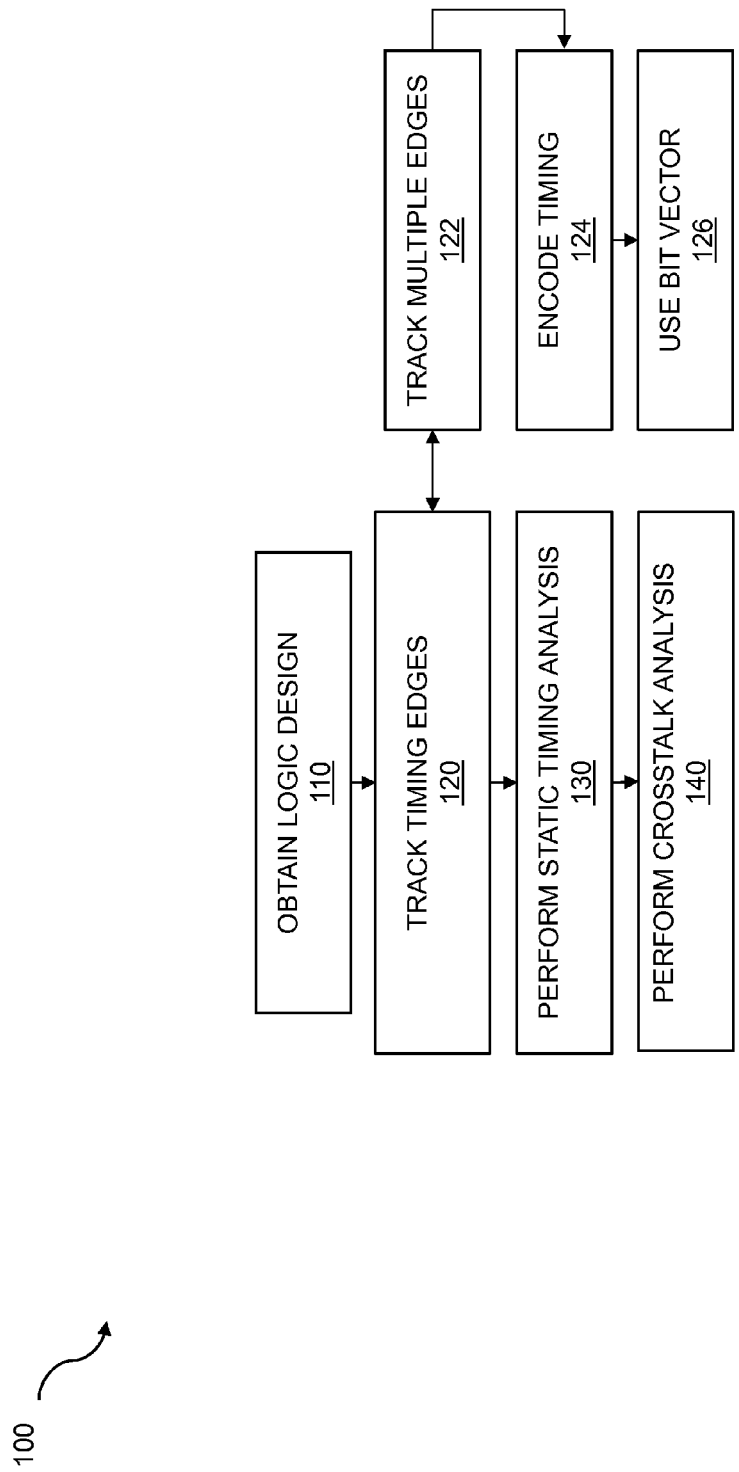
FIG. 1 is a flow diagram for timing edge analysis.

In traditional computer-automated electronic design analysis systems, a timing window which describes a range of times from the earliest minimum delay timing arrival to the latest maximum delay timing arrival to ensure a conservative graph-based static timing analysis (STA) for all possible paths passing through a victim net that could suffer from crosstalk effects is constructed. This range describes the earliest and latest arrival of any and all paths that can switch at a victim net. Timing windows for aggressor nets of the mentioned victim net are constructed in a similar manner. An overlap analysis is then performed between the constructed timing window of an aggressor net and the constructed victim timing window to determine if the aggressor net can impact the victim net's switching delay. However, using such an arrival window for the victim net for overlap analysis may lead to overly pessimistic results that are not representative of true circuit behavior.

There are several reasons behind the unrealistic pessimism that often results when merged timing windows are used for crosstalk analysis. One reason for the pessimism is that timing windows, due to on-chip variation (OCV), create an illusion of several paths where only one may exist. A single path may only switch at a single instant in time, while a timing window indicates that any number of switches may occur within the timing window. For maximum delay timing, the worst case switching time for a path is its latest-arriving time. Another reason for pessimism is the fact that merging timing windows for multiple paths as they converge into a circuit may indicate that switching may occur at impossible times. For example if a first path has a maximum delay time that is slower than a second path's minimum delay time, the time between the first path's maximum and the second path's minimum is included in the merged timing window, even though no switching is possible in that time period.

Methods and systems that track and use arrival edges for static timing analysis and crosstalk analysis are described herein. Timing edges do not suffer from effects of window widening due to OCV, because instead of using a switching region, timing edges are tracked. If both minimum and maximum delays are being analyzed, they may be tracked as separate edges, as maximum-delay timing is not impacted by minimum-delay values, and minimum-delay timing is not impacted by maximum-delay values. Timing edges accurately capture the active switching regions of a net, thereby avoiding overlap in regions where the net does not switch. Tracking edges instead of timing windows reduces pessimism in crosstalk overlap analysis.

In a practical modern circuit with hundreds of millions or even billions of gates, the possible number of timing edges is very large, potentially almost infinite, due to paths converging and re-converging throughout the design. But tracking a potentially infinite number of edges independently may not be practical, as it could conceivably use an infinite amount of storage and take an infinite amount of time for analysis. To avoid the need for a potentially infinite amount of storage to track arrival edges, the arrival edges may be compacted or encoded. In one embodiment, a maximum delay for a switching edge at a net, i.e. the delay for the worst case path, is calculated and stored as a number, and other potential maximum switching edges from other paths are encoded into a vector where the maximum delay and the vector together form a data structure to describe maximum delay switching edges at a net. In such an embodiment, the trailing path edges are differentially compacted with respect to the worst timing edge, hence the ability to reduce pessimism is not degraded. Some embodiments also create similar data structures to describe minimum delays for a switching edge at a net.

In at least one embodiment, the time leading up to the maximum delay time is quantized into discrete time intervals of equal length represented in a vector form wherein the vector includes a single bit per time interval. If one or more switching edges from a maximum delay through a path to that net could occur in a particular time interval, the bit corresponding to that time interval in the vector is set to one. If no switching edges from a maximum delay through any path to that net could occur in a time interval, the bit corresponding to that time interval in the vector is set to zero. The vector may be of any length, with each bit representing whether or not a switching edge may be present in a given time interval. The time intervals in a given evaluation may be of a constant length, but that constant length can be any interval of time and may vary between embodiments, between designs being analyzed, or even between passes of analysis on a single design. In some embodiments, the clock period may be divided into a fixed number of intervals, which in some embodiments may be based on standard word size such as 16 or 32, and all vectors may have a constant number of bits. In other embodiments, a fixed interval may be chosen and the vector may be of variable length. In at least one embodiment, a fixed interval with a fixed vector length is selected, and a separate maximum delay for the shortest path to a node is calculated and included in the data structure. In such an embodiment, the interval between the maximum delay for the shortest path and the intervals encoded by the vector is assumed to include at least one switching edge.

Because the worst case delay timing path is calculated and used as a reference for the digitization of trailing edge paths, i.e. differential encoding, no error is incurred on the critical path edges, and by using a constant time interval for an analysis and encoding switching edges into a bit vector, storage is minimized and is independent of the number of switching edges that may combine into a single net. Combining paths may be accomplished by simple shift and OR operations, which is computationally efficient in most computer architectures. This encoding also captures gaps in the switching region of a net which would be lost if a merged timing window was generated instead. By capturing the gaps, pessimism in crosstalk analysis may be reduced. In addition, by using the worst case delay timing path as a reference for the digitization of the trailing edge paths, errors in propagating trailing edges in downstream logic during static timing analysis (STA) are minimized. In particular, for a path without logic convergence, there are no additional errors for trailing paths incurred when the edges propagate through downstream logic.

FIG. 1 is a flow diagram for timing edge analysis. The flow 100 describes a computer-implemented method for timing analysis. The flow 100 includes obtaining a description for a logic design 110. The description may be in any form, including, but not limited to, VHDL, Verilog, or some other hardware description language; a graphical representation at an abstract level, such as a schematic; a graphical representation at a physical level, such as a mask set; or any other way of representing the design of an electronic circuit. The description for the logic design may include a graph description, or the obtaining of the description of the logic design may comprise generating a graph description based on the logic design. In some embodiments, a node of the graph represents an electronic component, such as a gate or logic block, and the edges of the graph represent interconnections between the electronic components.

The flow 100 includes tracking timing edges 120 on logic waveforms from the logic design. The timing edges may be for a victim net which may be subjected to a crosstalk analysis. In some embodiments, the timing edges may be calculated using on-chip variation (OCV) in addition to traditional max-min methods for timing analysis. Various paths which may cause a net to switch may be determined. One unique path through a graph of the logic design may generate a timing edge for that net. The timing edges may be based on converging waveforms within the logic design where a node of the graph has more than one input, so the timing edges at the inputs of the node may be combined at the output of the node. Thus multiple timing edges 122 may be tracked for a single net. One timing edge may be the slowest timing edge for that net or node, and may be referred to a as a leading edge, while one or more faster timing edges for the net or node may be referred to as trailing edges. Thus, the timing edges may include one or more of a leading edge and a trailing edge. One timing edge may have a maximum delay or a minimum delay that may be based on maximum delay switching times and minimum delay switching times, respectively, of the various logic elements in a path. The timing edges may include a timing edge for a fastest maximum delay timing path and a slowest maximum delay timing path, where the fastest maximum delay timing path is from a different path through the graph than the slowest maximum delay timing path. The timing edges also include a timing edge for a fastest minimum delay timing path and a slowest minimum delay timing path in some embodiments.

In some embodiments, the multiple timing edges may be encoded 124 to save storage space. In one embodiment, the delay of the leading edge, or slowest maximum delay timing edge, may be calculated and a differential from the leading edges to the other edges or trailing edges may be calculated and encoded. The encoding may be done in a bit vector 126 as described in more detail in FIGS. 2 and 5 below.

For a particular node in the graph, at least one worst-delay path exists that represents the slowest path through the graph to the node. This path may also be referred to as the slowest timing path. In some embodiments, another worst delay path may be found to represent a fastest path through the graph to that node, which may also be referred to as the fastest timing path. Thus, tracking an edge within the timing edges may track a worst delay timing path, and the worst delay timing path may include a maximum delay timing path used in setup analysis. Alternatively, the worst delay timing path may include a minimum delay timing path used in hold analysis. Some logic device may specify a setup time or a hold time that may be included in a path, so the worst delay timing path may include a setup time or a hold time.

The flow 100 further comprises performing static timing analysis 130 using the description and the timing edges that were tracked. In this embodiment, static timing analysis is performed without simulating particular logic values and assumes a worst case scenario for every logic element, where the worst case scenario can be either a minimum switching time or a maximum switching time. By tracking timing edges through a graph which represents the design, the static timing analysis may be performed without using timing arrival windows on a victim net.

The flow 100 comprises performing crosstalk analysis 140 based on the timing edges which were tracked. A victim net may have nearby aggressor nets that are capacitively coupled to the victim net. So if an aggressor net switches, a current change may be induced in the victim net. Crosstalk analysis analyzes such induced current which may be modeled as a further delay in the victim net. Thus, the crosstalk analysis may be based on an aggressor net and a victim net. In some embodiments, timing for the aggressor net and the victim net may be based on OCV. For a victim net with a multitude of aggressor nets, the combined effect of all aggressors is used for crosstalk analysis. Various steps in the flow 100 may be changed in order, repeated, omitted, or the like without departing from the disclosed concepts. Various embodiments of the flow 100 may be included in a computer program product embodied in a non-transitory computer readable medium that includes code executable by one or more processors.

Figure 2:
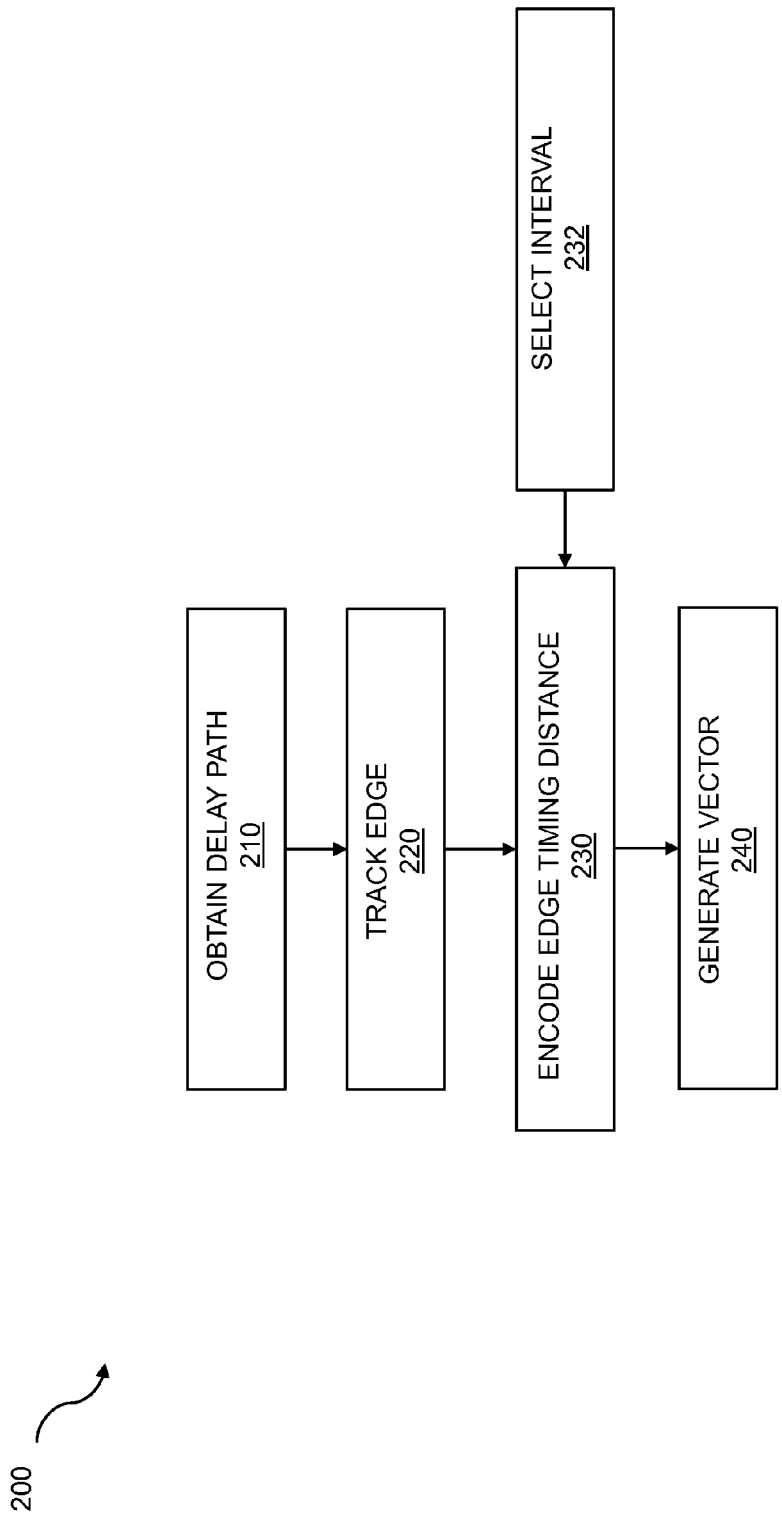
FIG. 2 is a flow diagram for the encoding of timing edges.

FIG. 2 is a flow diagram for encoding of timing edges. A flow 200 may continue from or be part of the previous flow 100. The flow 200 begins by obtaining delay paths 210 to a victim net. The delay paths may be obtained based on possible paths through the graph to a victim net along with the minimum delay and maximum delay times for the edges and nodes in the graph. The flow 200 continues by tracking edges 220. The timing edges may be tracked based on one edge per path through the graph. Two different cases for the timing edges may be tracked separately, with one case using the maximum delay times and another case using the minimum delay times. A timing edge with the slowest maximum delay may be determined and the delay may be calculated as a number. The number may be based on any unit of time, such as seconds (s), picoseconds (ps), tenths of ps (or 100s of femtoseconds), fractions of a clock cycle, or multiples of a fixed interval such as $\pi$ attoseconds. The number may be an integer, a fixed point number, a floating point number, a binary coded decimal number, or any other representation of a number in a computer, depending on the embodiment. The number may be calculated to any accuracy. In at least one embodiment, a 32 bit integer representing a number of tenths of ps is used to represent the slowest maximum delay timing edge. In some embodiments, a fastest minimum delay timing edge may be calculated and similarly stored.

The flow 200 continues by encoding timing distance 230. The encoding may create a data structure that describes the timing edges at a net. The data structure may include the number calculated for the slowest maximum delay timing edge and a bit vector for encoding other maximum delay timing edges, although other embodiments may use a different data structure to describe the timing edges. In embodiments, an interval 232 is selected. The interval may be any length of time, but may be determined based on a target clock cycle of a design, a maximum expected delay, the resolution used in representing the slowest maximum delay, or another user-decided timing interval. In some embodiments, the interval is globally set or implied for a particular analysis, but in some embodiments, the interval may be included as a part of the data structure. In at least one embodiment, the selected interval is 1/16 of a target clock cycle.

Additional maximum delay timing edges, along with the differential from the slowest maximum delay timing edge, may be calculated. The differential may be divided by the interval and any decimal may be dropped in order to digitize the additional maximum delay timing edges to the nearest interval. A vector 240 is then generated to be a part of the data structure by setting a bit in a data word if there is a maximum delay timing edge digitized to an interval corresponding to the bit number of the data word. Thus, the bit vector may describe discrete intervals. For example, given an interval of t, the $n^{th}$ bit of the vector is set if a timing edge occurs between n×t and (n+1)×t before the slowest maximum delay timing edge.

The vector may be of variable length or of fixed length, depending on the embodiment. In some embodiments a fixed length vector is used and a second number is calculated for the fastest maximum delay timing edge. An interval may be implied between the interval farthest from the slowest maximum delay timing edge that is included in the vector and the number representing the fastest maximum delay timing edge. The implied interval may be determined to be set if the fastest maximum delay timing edge is set.

In some embodiments, a second data structure may be generated to describe the fastest minimum delay timing edge and the data structure may include a vector encoding other minimum delay timing edges. Thus, the encoding can define a fastest maximum delay timing path and a slowest maximum delay timing path or a fastest minimum delay timing path and a slowest minimum delay timing path. Various steps in the flow 200 may be changed in order, repeated, omitted, or the like without departing from the disclosed concepts. Various embodiments of the flow 200 may be included in a computer program product embodied in a non-transitory computer readable medium that includes code executable by one or more processors.

Figure 3:
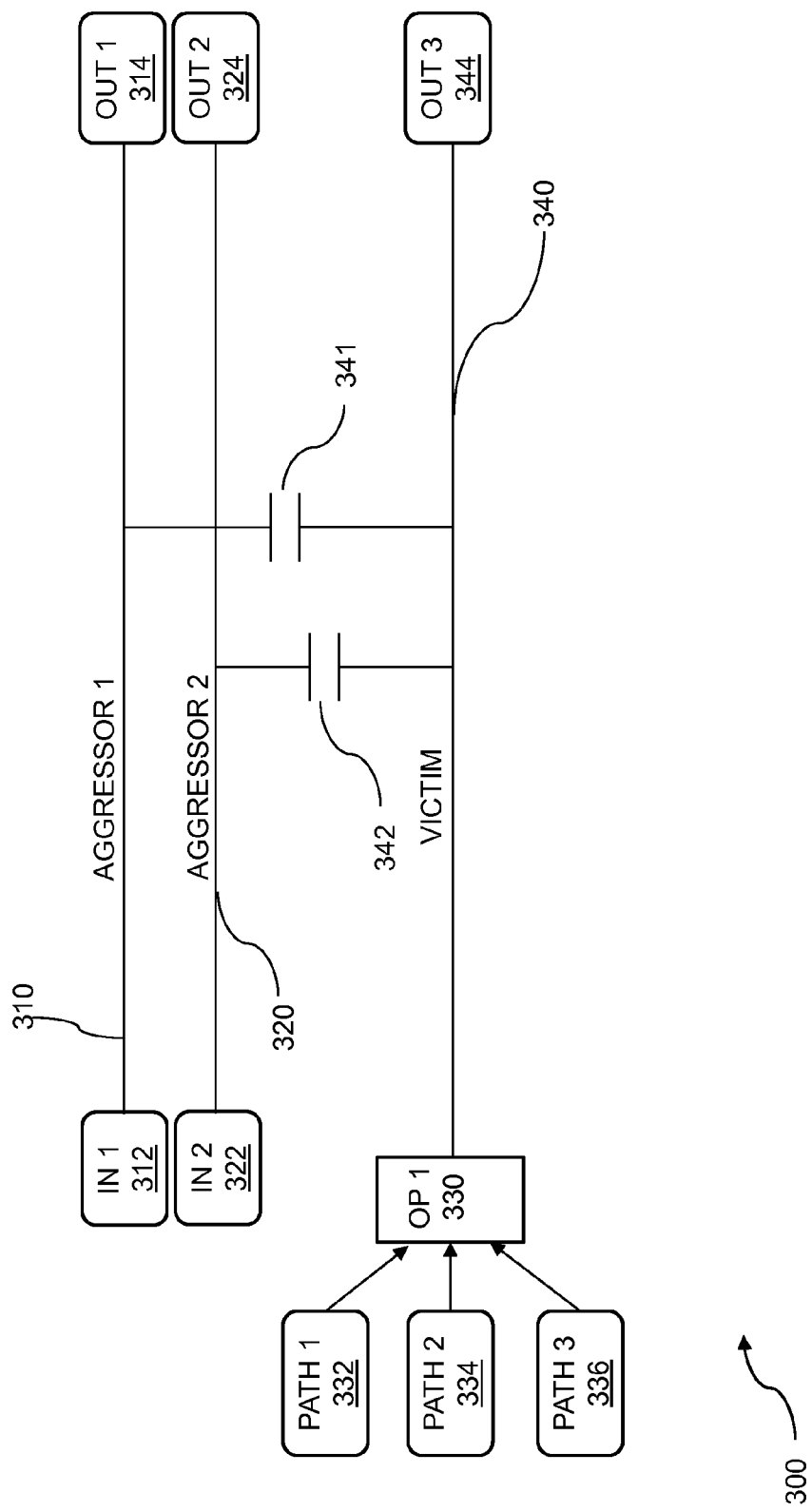
FIG. 3 is an example showing aggressor and victim nets.

FIG. 3 is an example showing aggressor and victim nets. The circuit 300 includes a first aggressor net 310 driven from an input 312 to the net and driving an output 314 of the net. The first aggressor net 310 may switch in a first aggressor window of time. The circuit 300 also includes a second aggressor net 320 driven from an input 322 to the net and driving an output 324 of the net. The second aggressor net 320 may switch in a second aggressor window of time. An operator 330, which may be any type of electronic circuit including, but not limited to, a logic gate such as an AND, NAND, OR, or NOR gate, an inverter, an arithmetic logic unit (ALU), a flip-flop, or any other type of digital logic circuitry, may have multiple input paths which may cause it to switch. In the example shown, the operator 330 has three input paths, a first path 332, a second path, 334, and a third path 336. Note that the existence of three input paths does not necessarily indicate that the operator 330 has three inputs, as it could have one or two inputs with other logic gates upstream employing fan-in to create multiple paths.

The operator 330 has an output that drives the victim net 340. The victim net 340 is capacitively coupled to the first aggressor net 310 by a capacitor 341 and to the second aggressor net 320 by another capacitor 342. The capacitors 341 and 342 may be created by parasitic and/or stray capacitance rather than by specific capacitive components or separate structures. It's possible to have more than one coupling capacitor between the victim and an aggressor net. The victim net 340 has an output 344 which may drive another operator. Crosstalk analysis may be performed for the victim net 340 to determine if a critical timing edge occurs during the first or second aggressor windows of time, thereby speeding up or slowing down the critical timing edge for the victim net. Therefore, the performing of crosstalk analysis may include analysis of a victim net and an aggressor net, or may include analysis of a victim net and a plurality of aggressor nets.

Figure 4:
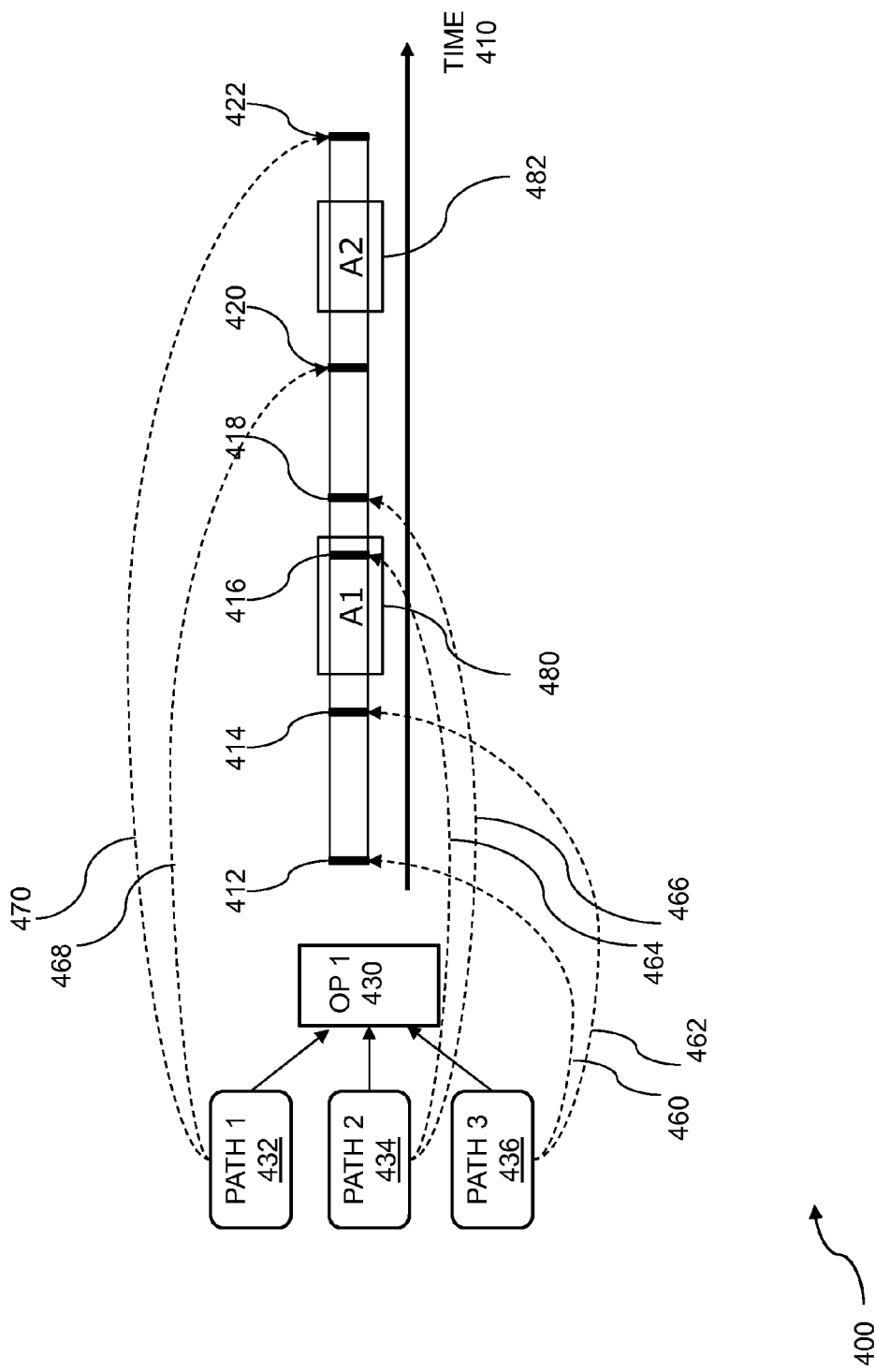
FIG. 4 is an example showing minimum and maximum gate path delay with aggressor nets switching.

FIG. 4 is an example 400 showing minimum and maximum gate path delay with aggressor nets switching. A timeline 410 shows several timing edges 412-422 which may occur over time at a victim net. The victim net may be driven from a logic operator 430. The logic operator in the example 400 has three different paths which may generate a timing edge. A first path 432, a second path 434 or a third path 436 may generate a timing edge at the operator 430. The third path 436 has a minimum delay 460 which may generate the leading timing edge 412. The timing edge 412 is the fastest minimum delay timing edge for the victim net. The third path 436 also has a maximum delay 462 which may generate the trailing timing edge 414. The second path 434 has a minimum delay 464 which may generate trailing timing edge 416 and a maximum delay 466 which may generate trailing timing edge 418. The first path 432 has a minimum delay 468 which may generate trailing timing edge 420 and a maximum delay 470 which may generate leading timing edge 422, an edge which may be the slowest maximum delay timing path, also called the worst delay edge. Thus, the timing edges may include a timing edge 414 for a fastest maximum delay timing path and a timing edge 422 for a slowest maximum delay timing path. The timing edges may also include a timing edge 412 for a fastest minimum delay timing path and a timing edge 420 for a slowest minimum delay timing path.

A first aggressor switching window 480 and a second aggressor switching window 482 may be used for crosstalk analysis of the victim net. Depending on circuit topology, any number of aggressor switching windows may be used for crosstalk analysis of a victim net. The logic design may include multiple paths which converge given several parameters: timing through the multiple paths has time between a fastest maximum delay timing for one path and slowest maximum delay of another path, an aggressor signal switches in the time between the fastest maximum delay timing and slowest maximum delay, and the multiple paths which converge form a victim net.

Figure 5:
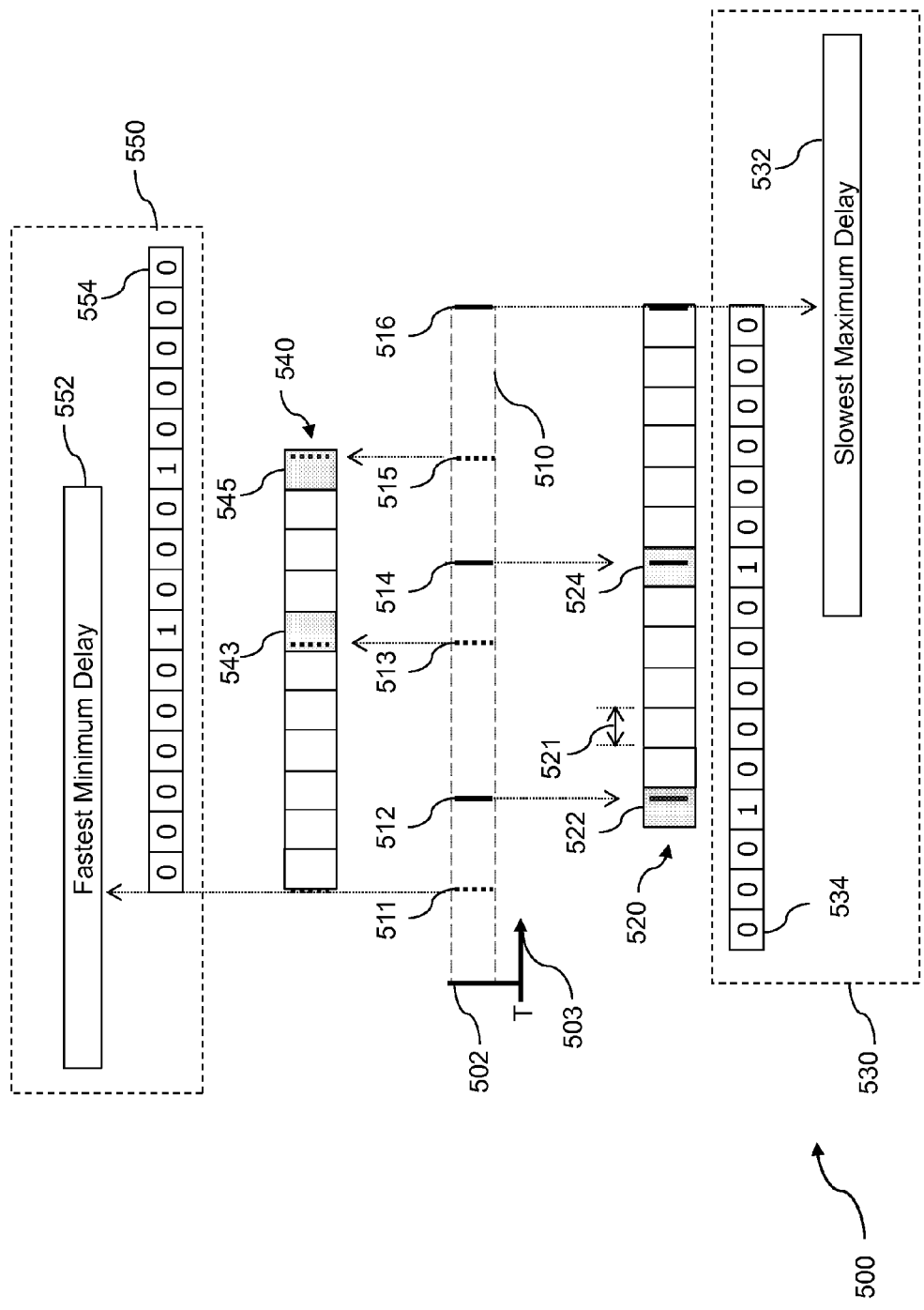
FIG. 5 is an example data structure for delay edges.

FIG. 5 is an example data structure 500 for delay edges. A start of time 502, or time zero, where time 503 advances to the right, is shown for a timeline 510. Several timing edges 511-516 may be calculated as shown on the timeline 510. A leading slowest maximum delay timing edge 516 may be trailed by a second maximum delay timing edge 514 and a third maximum delay timing edge 512. A leading fastest minimum delay timing edge 511 may be trailed by a second minimum delay timing edge 513 and a third minimum delay timing edge 515. Note that the concept of trailing and leading edges is flipped between maximum delay timing analysis and minimum delay timing analysis. Data structures 500 for maximum delay timing edges and minimum delay timing edges may be generated based on the calculated timing edges.

To encode the maximum delay timing edges, a timing interval 521 may be selected and a differential between the leading timing edge 516 and the trailing timing edges may be calculated as a number of timing intervals 520. The trailing timing edge 514 may be determined to trail the leading timing edge 516 by between 6 and 7 time intervals, so it may be digitized into the sixth time interval 524. The trailing timing edge 512 may be determined to trail the leading timing edge 516 by between 12 and 13 time intervals, so it may be digitized into the twelfth time interval 522. A data structure 530 may be created to represent the maximum delay timing edges, which includes a number 532 and an encoded vector 534. The slowest maximum delay timing edge 516 is calculated and stored as a number 532. An integer, a fixed point number, a floating point number, or any other type of data representation, may be used to represent the slowest maximum delay timing edge 516, or leading edge. Any number of bits may be used for the number 532, such as a 16-bit integer, a 32-bit fixed point number, or a 64-bit floating point representation, depending on the embodiment.

The digitized trailing edges may be encoded into a bit vector 534. The bit vector may include one bit for each interval of time before the leading timing edge. The $n^{th}$ bit of the vector is set if a timing edge occurs between n×t and (n+1)×t before the slowest maximum delay timing edge, where t is the time interval. Thus, in the example shown, the timing edge 514 is encoded with a 1 in the $6^{th}$ bit, and the timing edge 512, is encoded with a 1 in the $12^{th}$ bit, allowing the bit vector to define multiple maximum delay paths.

To encode the minimum delay timing edges, a timing interval 521 is used and a differential between the leading timing edge, which is the shortest minimum delay timing edge 511, and the trailing timing edges is calculated as a number of timing intervals 521. The same or different timing intervals can be used for maximum and minimum delay edges. Note that for the minimum delay timing edges, the differential for the trailing edges is added time from the shortest minimum delay timing edge 511, instead of subtracted time from the maximum delay timing edge 516. In the given example, the trailing timing edge 513 is determined to trail the leading timing edge 511 by between 6 and 7 time intervals, so it may be digitized into the sixth time interval 543 within a set of time intervals 540. Likewise, the trailing timing edge 515 is determined to trail the leading timing edge 511 by between 10 and 11 time intervals, so it may be digitized into the tenth time interval 545. A data structure 550 which includes a number 552 and an encoded vector 554 may be created to represent the minimum delay timing edges. The fastest minimum delay timing edge 511 may be calculated and stored as a number 552. The vector 554 is encoded so that the $n^{th}$ bit of the vector is set if a timing edge occurs between n×t and (n+1)×t after the fastest minimum delay timing edge, where t is the time interval. Note that the vector 554 is shown with the least significant bit (LSB) on the left.

While fixed 16 bit vectors are shown in FIG. 5, other embodiments may use different fixed length vectors. Still other embodiments may use variable length vectors. Some embodiments may use a fixed length vector with a time interval that does not allow all trailing timing edges to be encoded. In some embodiments, the last trailing timing edge, which may be the fastest maximum delay timing edge for the maximum delay timing edges or the slowest minimum delay timing edge for minimum delay timing edges, may be calculated and stored as another number in the data structure. An implicit time interval is defined between the last trailing timing edge and the last interval encoded by the vector. If the last trailing timing edge is set to a valid number, it may be assumed that the implicit interval has at least one timing edge. This may allow for more accurate encoding of the initial trailing edges without losing track of the later trailing edges.

Figure 6:
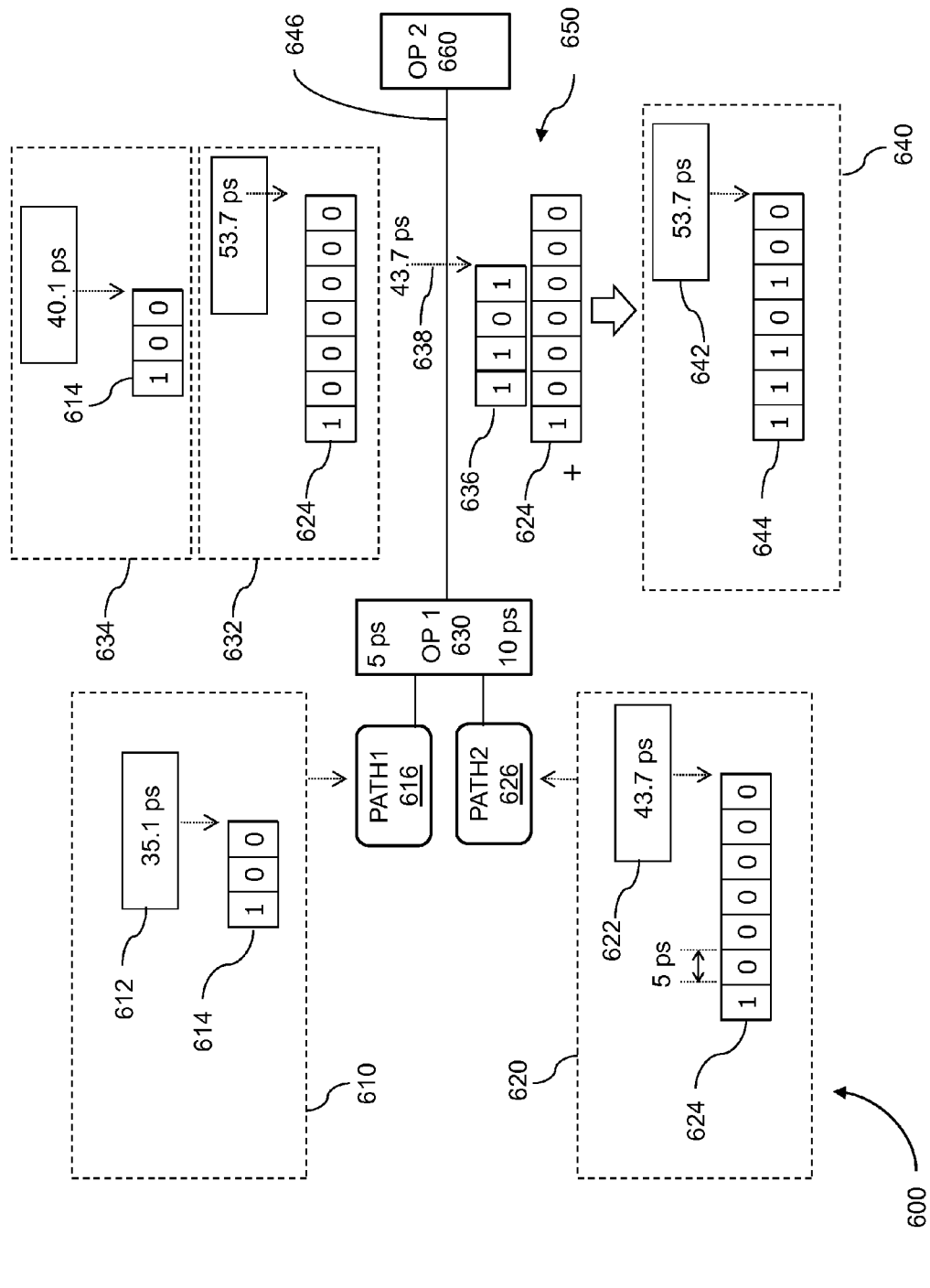
FIG. 6 is an example showing digitized tracking of edges for convergent paths.

FIG. 6 is an example showing digitized tracking of edges for convergent paths. The example 600 given shows a calculation for maximum delay timing edges. A similar operation may occur for minimum delay timing edges, if they are being tracked. A first data structure 610 including a number 612 and a bit vector 614 may represent maximum delay timing edges for a first path 616. A second data structure 620 including a number 622 and a bit vector 624 may represent maximum delay timing edges for a second path 626. The two different numbers—612 and 622—representing two different slowest maximum delay timing edges, allow tracking a timing between the edge and a second edge for another worst delay-timing path. The bit vectors, 614 and 624 in the example 600, are of variable length with each bit representing a 5-ps time interval.

The two paths—616 and 626—may converge in an operator 630, which may be a logic gate with two inputs. To calculate the data structure 640 which includes a number 642 and a bit vector 644, and to represent timing edges that may emerge from the operator 630, the data structures with their respective slowest maximum delay timing edge—in this example 43.7 ps from the second data structure 620 and 35.1 ps from the first data structure 610—may be added to the maximum delays of the operator 630—in this example 10 ps to path 626 and 5 ps to path 616—to determine the maximum delay timing edge of data structures 632 and 634 at the output of operator 630—in this example 53.7 ps for data structure 632 and 40.1 ps for data structure 634. In order to determine the slowest maximum delay timing edge for the path 646, the maximum of the maximum delay timing edge of data structures 632 and 634—in this example, 53.7—is computed. The resulting number, 53.7, is stored in the number 642 of the data structure 640.

The operation 650 shows the calculation of the bit vector 644 for the data structure 640. The numbers of the two path data structures 632 and 634 are used to align the bit vectors in time. In many instances, the smaller maximum delay—in the example given, 40.1 of data structure 634—will not exactly align with a time interval boundary of the maximum delay of the other data structure. The first data structure 634 describes a leading maximum delay timing edge that occurs at 40.1 ps and at least one other maximum delay timing edge that occurs between 25.1 ps and 30.1 ps. The leading timing edge at 40.1 ps falls into the $1^{st}$ time interval (if starting the count at 0) of the bit vector 624 of the second data structure since that box represents 38.7 ps to 43.7 ps. However, because of the misalignment of the bit vectors 624 and 614 between the two data structures 632 and 634, the trailing timing edge(s) described by the first data structure 634 may fall into either the $4^{th}$ or $5^{th}$ time intervals. That means, in order to allow the two bit vectors to be merged, a new bit vector 636 is created with a 43.7 ps maximum delay 638 which aligns with a time interval boundary of the bit vector 624. The new bit vector 636 may be calculated by shifting the original bit vector 614 left one spot while shifting in a '1,' and ORing it with the original bit vector 614. This encodes the timing between the edge for the worst delay-timing path and the second edge for the other worst delay-timing path. Then the new bit vector 636 derived from the first data structure 634 may be ORed with the bit vector 624 of the second data structure 632 to generate the bit vector 644 for the output data structure 640, which may then be used for analysis of another operator 660. Thus, a plurality of converging waveforms are analyzed by performing bit operations on bit vectors for the plurality of converging waveforms.

Figure 7:
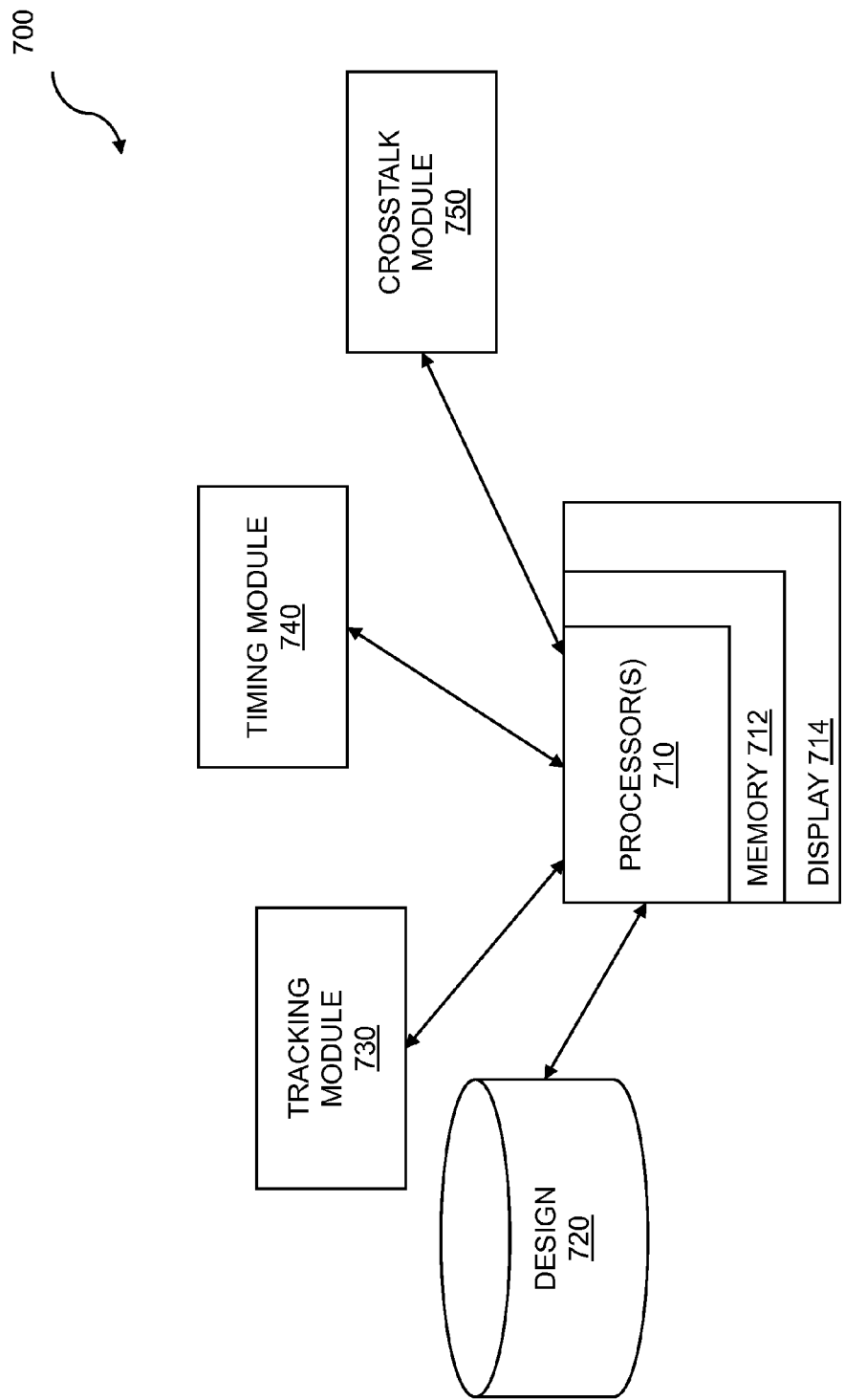
FIG. 7 is a system diagram for timing-edge based analysis.

FIG. 7 is a system diagram for timing edge based analysis. The system 700 includes one or more processors 710 coupled to memory 712 which may be used to store computer code instructions and/or data. A display 714 may also be included which may be any electronic display, including but not limited to, a computer display, a laptop screen, a net-book screen, a tablet screen, a cell phone display, a mobile device display, a remote with a display, a television, a projector, or the like. A description of a design 720 may be stored on a computer disk or other computer storage medium. A tracking module 730 may be included and may contain computer code to allow the one or more processors 714 to track timing edges in the logic design 720. A timing module 740 may be included and may contain computer code to allow the one or more processors 714 to analyze timing for the logic design 720. A crosstalk module 750 may also be included and may contain computer code to allow the one or more processors 714 to perform crosstalk analysis on the logic design 720. In at least one embodiment the functions of the tracking module 730, the timing module 740, and the crosstalk module 750 are performed by the one or more processors 710.

The system 700 may include a computer program product embodied in a non-transitory computer readable medium for design timing. In some embodiments, the computer program product includes the tracking module 730, the timing module 740, and the crosstalk module 750. The computer program product embodied in a non-transitory computer readable medium for design timing may comprise code for obtaining a description for a logic design, code for tracking timing edges on logic waveforms from the logic design, code for performing static timing analysis using the description and the timing edges that were tracked, and code for performing crosstalk analysis based on the timing edges that were tracked. The one or more processors 714 may perform a computer-implemented method for semiconductor timing analysis comprising obtaining a description for a logic design 720 on a semiconductor chip, analyzing timing for the logic design 720, tracking timing edges on logic waveforms from the logic design 720 based on the analyzing, and performing crosstalk analysis to determine a timing impact of one net switching that is a neighbor to a net for which the timing edges were tracked.

Each of the above methods may be executed on one or more processors on one or more computer systems. Embodiments may include various forms of distributed computing, client/server computing, and cloud based computing. Further, it will be understood that the depicted steps or boxes contained in this disclosure's flow charts are solely illustrative and explanatory. The steps may be modified, omitted, repeated, or re-ordered without departing from the scope of this disclosure. Further, each step may contain one or more sub-steps. While the foregoing drawings and description set forth functional aspects of the disclosed systems, no particular implementation or arrangement of software and/or hardware should be inferred from these descriptions unless explicitly stated or otherwise clear from the context. All such arrangements of software and/or hardware are intended to fall within the scope of this disclosure.

The block diagrams and flowchart illustrations depict methods, apparatus, systems, and computer program products. The elements and combinations of elements in the block diagrams and flow diagrams, show functions, steps, or groups of steps of the methods, apparatus, systems, computer program products and/or computer-implemented methods. Any and all such functions—generally referred to herein as a "circuit," "module," or "system"—may be implemented by computer program instructions, by special-purpose hardware-based computer systems, by combinations of special purpose hardware and computer instructions, by combinations of general purpose hardware and computer instructions, and so on.

A programmable apparatus which executes any of the above mentioned computer program products or computer-implemented methods may include one or more microprocessors, microcontrollers, embedded microcontrollers, programmable digital signal processors, programmable devices, programmable gate arrays, programmable array logic, memory devices, application specific integrated circuits, or the like. Each may be suitably employed or configured to process computer program instructions, execute computer logic, store computer data, and so on.

It will be understood that a computer may include a computer program product from a computer-readable storage medium and that this medium may be internal or external, removable and replaceable, or fixed. In addition, a computer may include a Basic Input/Output System (BIOS), firmware, an operating system, a database, or the like that may include, interface with, or support the software and hardware described herein.

Embodiments of the present invention are neither limited to conventional computer applications nor the programmable apparatus that run them. To illustrate: the embodiments of the presently claimed invention could include an optical computer, quantum computer, analog computer, or the like. A computer program may be loaded onto a computer to produce a particular machine that may perform any and all of the depicted functions. This particular machine provides a means for carrying out any and all of the depicted functions.

Any combination of one or more computer readable media may be utilized including but not limited to: a non-transitory computer readable medium for storage; an electronic, magnetic, optical, electromagnetic, infrared, or semiconductor computer readable storage medium or any suitable combination of the foregoing; a portable computer diskette; a hard disk; a random access memory (RAM); a read-only memory (ROM), an erasable programmable read-only memory (EPROM, Flash, MRAM, FeRAM, or phase change memory); an optical fiber; a portable compact disc; an optical storage device; a magnetic storage device; or any suitable combination of the foregoing. In the context of this document, a computer readable storage medium may be any tangible medium that can contain or store a program for use by or in connection with an instruction execution system, apparatus, or device.

It will be appreciated that computer program instructions may include computer executable code. A variety of languages for expressing computer program instructions may include without limitation C, C++, Java, JavaScript™, ActionScript™, assembly language, Lisp, Perl, Tcl, Python, Ruby, hardware description languages, database programming languages, functional programming languages, imperative programming languages, and so on. In embodiments, computer program instructions may be stored, compiled, or interpreted to run on a computer, a programmable data processing apparatus, a heterogeneous combination of processors or processor architectures, and so on. Without limitation, embodiments of the present invention may take the form of web-based computer software, which includes client/server software, software-as-a-service, peer-to-peer software, or the like.

In embodiments, a computer may enable execution of computer program instructions including multiple programs or threads. The multiple programs or threads may be processed approximately simultaneously to enhance utilization of the processor and to facilitate substantially simultaneous functions. By way of implementation, any and all methods, program codes, program instructions, and the like described herein may be implemented in one or more threads which may in turn spawn other threads, which may themselves have priorities associated with them. In some embodiments, a computer may process these threads based on priority or other order.

Unless explicitly stated or otherwise clear from the context, the verbs "execute" and "process" may be used interchangeably to indicate execute, process, interpret, compile, assemble, link, load, or a combination of the foregoing. Therefore, embodiments that execute or process computer program instructions, computer-executable code, or the like may act upon the instructions or code in any and all of the ways described. Further, the method steps shown are intended to include any suitable method of causing one or more parties or entities to perform the steps. The parties performing a step, or portion of a step, need not be located within a particular geographic location or country boundary. For instance, if an entity located within the United States causes a method step, or portion thereof, to be performed outside of the United States then the method is considered to be performed in the United States by virtue of the causal entity.

While the invention has been disclosed in connection with preferred embodiments shown and described in detail, various modifications and improvements thereon will become apparent to those skilled in the art. Accordingly, the forgoing examples should not limit the spirit and scope of the present invention; rather it should be understood in the broadest sense allowable by law.

What is claimed is:

1. A computer-implemented method for timing analysis comprising:
    obtaining a description for a logic design including a victim net and an aggressor net where the logic design includes multiple paths which converge to form the victim net;
    tracking timing edges, using one or more processors, on logic waveforms from the logic design across the multiple paths, where timing through the multiple paths has a time between a fastest maximum delay timing for one path and a slowest maximum delay of another path;
    performing static timing analysis using the description and the timing edges that were tracked across the multiple paths; and
    performing crosstalk analysis based on the timing edges that were tracked where the crosstalk analysis includes determination of a further delay for the victim net due to the aggressor net switching, where the aggressor net switches in the time between the fastest maximum delay timing and the slowest maximum delay.

2. The method of claim 1 wherein the description for the logic design includes a graph description.

3. The method of claim 2 wherein the obtaining of the description for the logic design comprises generating the graph description based on the logic design.

4. The method of claim 1 wherein the timing edges include a timing edge for a fastest maximum delay timing path and a timing edge for a slowest maximum delay timing path.

5. The method of claim 4 wherein the timing edges further comprise a timing edge for a fastest minimum delay timing path and a timing edge for a slowest minimum delay timing path.

6. The method of claim 1 wherein the performing crosstalk analysis includes analysis of the victim net and a plurality of aggressor nets.

7. The method of claim 1 wherein the timing edges include one or more of a leading edge and a trailing edge.

8. The method of claim 1 wherein the timing edges are calculated using on-chip variation (OCV).

9. The method of claim 1 wherein timing for the aggressor net and the victim net is based on OCV.

10. The method of claim 1 wherein the static timing analysis is performed without using timing arrival windows on a victim net.

11. The method of claim 1 wherein the tracking of an edge within the timing edges tracks a worst delay timing path.

12. The method of claim 11 wherein the worst delay timing path includes a maximum delay timing path used in setup analysis.

13. The method of claim 11 wherein the worst delay timing path includes a minimum delay timing path used in hold analysis.

14. The method of claim 11 further comprising tracking a timing between the edge and a second edge for another worst delay timing path.

15. The method of claim 14 further comprising encoding the timing between the edge for the worst delay timing path and the second edge.

16. The method of claim 15 further comprising using a bit vector for the encoding.

17. The method of claim 16 wherein a plurality of converging waveforms are analyzed by performing bit operations on bit vectors for the plurality of converging waveforms.

18. The method of claim 16 wherein the bit vector describes discrete intervals.

19. The method of claim 15 wherein the encoding can define a fastest maximum delay timing path and a slowest maximum delay timing path or a fastest minimum delay timing path and a slowest minimum delay timing path.

20. The method of claim 1 further comprising determining that the aggressor net switches in a time between the fastest maximum delay time and the slowest maximum delay timing.

21. The method of claim 1 further comprising determining if a critical timing edge occurs during an aggressor switching window of time.

22. A computer-implemented method for semiconductor timing analysis comprising:
    obtaining a description for a logic design on a semiconductor chip where the logic design includes a victim net and an aggressor net and where the logic design includes multiple paths which converge to form the victim net;
    analyzing timing for the logic design across the multiple paths;
    tracking timing edges, using one or more processors, on logic waveforms from the logic design based on the analyzing across the multiple paths, where timing through the multiple paths has a time between a fastest maximum delay timing for one path and a slowest maximum delay of another path; and
    performing crosstalk analysis to determine a timing impact of the aggressor net switching that is a neighbor to the victim net for which the timing edges were tracked where the crosstalk analysis includes determination of a further delay for the victim net due to the aggressor net switching, where the aggressor net switches in the time between the fastest maximum delay timing and the slowest maximum delay.

23. A computer system for timing analysis comprising:
    a memory which stores instructions;
    one or more processors coupled to the memory wherein the one or more processors are configured to:

obtain a description for a logic design including a victim net and an aggressor net where the logic design includes multiple paths which converge to form the victim net;

track timing edges on logic waveforms from the logic design across the multiple paths, where timing through the multiple paths has a time between a fastest maximum delay timing for one path and a slowest maximum delay of another path;

perform static timing analysis using the description and the timing edges that were tracked across the multiple paths; and perform crosstalk analysis based on the timing edges that were tracked where the crosstalk analysis includes determination of a further delay for the victim net due to the aggressor net switching, where the aggressor net switches in the time between the fastest maximum delay timing and the slowest maximum delay.

24. The system of claim 23 wherein the timing edges include a timing edge for a fastest maximum delay timing path and a timing edge for a slowest maximum delay timing path.

25. The system of claim 24 wherein the timing edges further comprise a timing edge for a fastest minimum delay timing path and a timing edge for a slowest minimum delay timing path.

26. The system of claim 23 wherein the timing edges include one or more of a leading edge and a trailing edge.

27. The system of claim 23 wherein the tracking of an edge within the timing edges tracks a worst delay timing path.

28. The system of claim 27 wherein the worst delay timing path includes a maximum delay timing path used in setup analysis.

29. A computer program product embodied in a non-transitory computer readable medium for design timing comprising:

code for obtaining a description for a logic design including a victim net and an aggressor net where the logic design includes multiple paths which converge to form the victim net;

code for tracking timing edges on logic waveforms from the logic design across the multiple paths;

code for performing static timing analysis using the description and the timing edges that were tracked across the multiple paths, where timing through the multiple paths has a time between a fastest maximum delay timing for one path and a slowest maximum delay of another path; and code for performing crosstalk analysis based on the timing edges that were tracked where the crosstalk analysis includes determination of a further delay for the victim net due to the aggressor net switching, where the aggressor net switches in the time between the fastest maximum delay timing and the slowest maximum delay.

30. The computer program product of claim 29 wherein the timing edges include a timing edge for a fastest maximum delay timing path and a timing edge for a slowest maximum delay timing path.

31. The computer program product of claim 30 wherein the timing edges further comprise a timing edge for a fastest minimum delay timing path and a timing edge for a slowest minimum delay timing path.

32. The computer program product of claim 29 wherein the timing edges include one or more of a leading edge and a trailing edge.

33. The computer program product of claim 29 wherein the tracking of an edge within the timing edges tracks a worst delay timing path.

34. The computer program product of claim 33 wherein the worst delay timing path includes a maximum delay timing path used in setup analysis.

* * * * *